July 15, 1969  A. G. RAYBURN  3,455,013
METHOD OF MANUFACTURE OF FLEXIBLE COUPLINGS
Filed Oct. 28, 1964  4 Sheets-Sheet 1

INVENTOR
ALDEN G. RAYBURN
BY *Strauch, Nolan & Neale*
ATTORNEYS

July 15, 1969 A. G. RAYBURN 3,455,013
METHOD OF MANUFACTURE OF FLEXIBLE COUPLINGS
Filed Oct. 28, 1964 4 Sheets-Sheet 2

INVENTOR
ALDEN G. RAYBURN

ATTORNEYS

July 15, 1969            A. G. RAYBURN            3,455,013
METHOD OF MANUFACTURE OF FLEXIBLE COUPLINGS
Filed Oct. 28, 1964            4 Sheets-Sheet 3
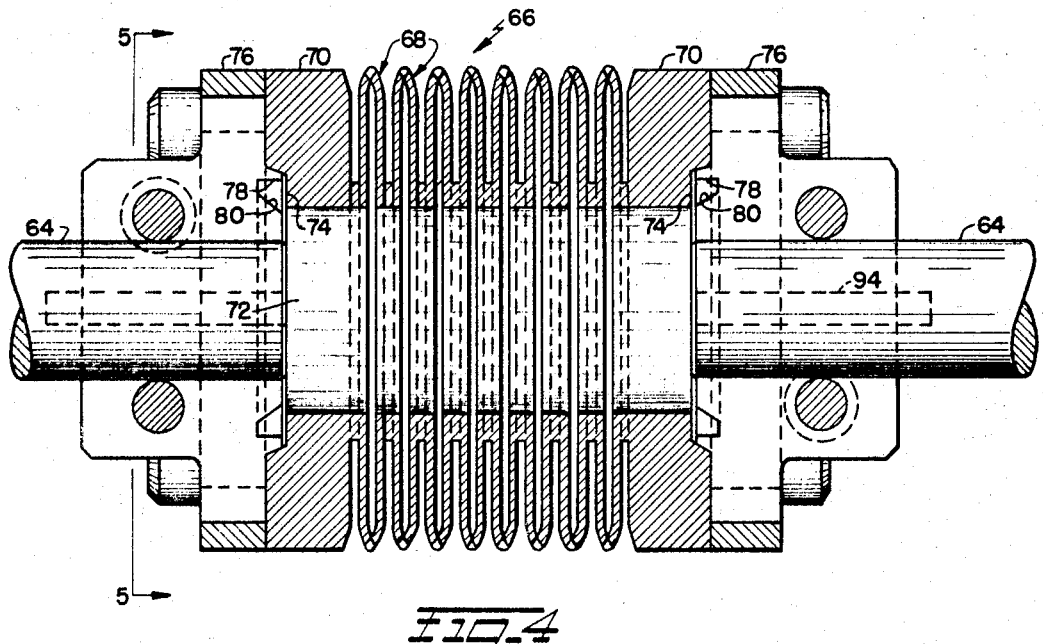
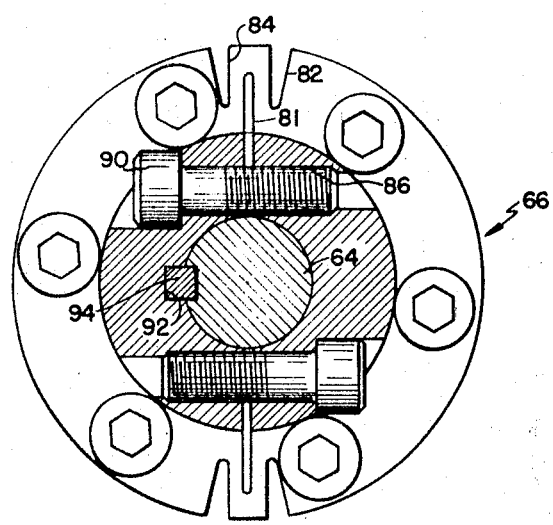
INVENTOR
ALDEN G. RAYBURN
BY *Strauch, Nolan & Neale*
ATTORNEYS

INVENTOR
ALDEN G. RAYBURN

United States Patent Office 3,455,013
Patented July 15, 1969

3,455,013
METHOD OF MANUFACTURE OF FLEXIBLE COUPLINGS
Alden G. Rayburn, P.O. Box 5538,
Carmel, Calif. 93921
Filed Oct. 28, 1964, Ser. No. 407,165
Int. Cl. F16d *3/78;* F16l *27/10*
U.S. Cl. 29—454             6 Claims This invention relates to couplings and more particularly to improved flexible couplings which may be hollow for fluid transmission or which may be used to provide a positive but flexible drive connection between a driving shaft and a driven shaft and connecting members therefor. The invention further relates to novel methods for the manufacture of such couplings.

Couplings of the type with which the present invention is concerned find utility in a wide variety of industrial applications. Because of the wide demand for such units, very substantial investments have been made for their development. While existing couplings provide generally satisfactory performance they are notoriously expensive and often have a relatively short service lift.

In accordance with the present invention these deficiencies and others are overcome by the provision of unique couplings having flexible bellows type body portions fabricated from a single piece of stock. The principal steps in the fabrication are preferably performed in a single machine set up. In one simplified form the entire coupling including the end attaching flanges is made from a single piece of stock. In other forms the attaching end connecting members are formed separately. In these latter forms the joints between the connecting members and the flexible body portions are so constructed that the need for separate seals is eliminated thus extending the useful pressure and temperature range of the couplings.

The coupling, or at least the central flexible bellows type body portion of the coupling may be formed from a single piece of thick-walled tubular stock. A series of alternate deep and shallow external grooves is cut or otherwise formed in the cylindrical tubular body of the stock to form portions of the convolution walls. The outer peripheral edges of the adjacent wall portions at opposite sides of the deeper cuts are then bent toward each other, substantially into contact and these edges are then welded together to form the outer peripheries of the individual convolutions. Subsequently, the tubular workpiece is internally bored or reamed until the inner edges of the deeper grooves or cuts are opened to complete the formation of the individual convolutions. The coupling is then completed by machining connecting members or connecting flanges on its opposite ends.

Accordingly, it is a major object of this invention to provide a novel machined bellows coupling having end flanges integrally combined with the bellows body for use as a drive coupling or fluid carrying coupling.

Another object is to provide a low-cost thick-walled all-metal flexible coupling of high strength and good temperature and wear resistance.

Another object is to provide a novel drive coupling having connecting members specially adapted to provide backlash-free connection for the working members.

A further object is to provide a novel fluid carrying hollow bellows coupling having end flanges integrally joined with the bellows body forming a fluid tight seal.

A further object is to provide a novel fluid carrying coupling having an expansion and contraction compensating end flange which provides an all metal seal with the fluid carrying members which the coupling joins.

An additional object is to provide a flexible machined bellows coupling that eliminates the need for lubrication and provides noise-free operation.

An additional object is to provide a novel machined bellows coupling which can be easily installed and provides maximum ease of replacement.

An additional object is to provide a novel method for producing flexible couplings in a single set-up.

Another object is to provide a novel method for producing flexible couplings which is rapid and relatively inexpensive.

Another object is to provide a novel method for producing flexible couplings which eliminates internal cutting operations.

Another object is to provide a novel method for producing flexible couplings which eliminates all internal welding steps and all problems of alignment of parts during welding.

Other novel features will become apparent by reference to the claims and the description in connection with the accompanying drawings wherein:

FIGURE 4 is a transverse sectional view of another embodiment of the coupling of this invention connected to driving and driven shafts;

FIGURE 5 is a transverse section taken along line 5—5 of FIGURE 4;

Figure 1:
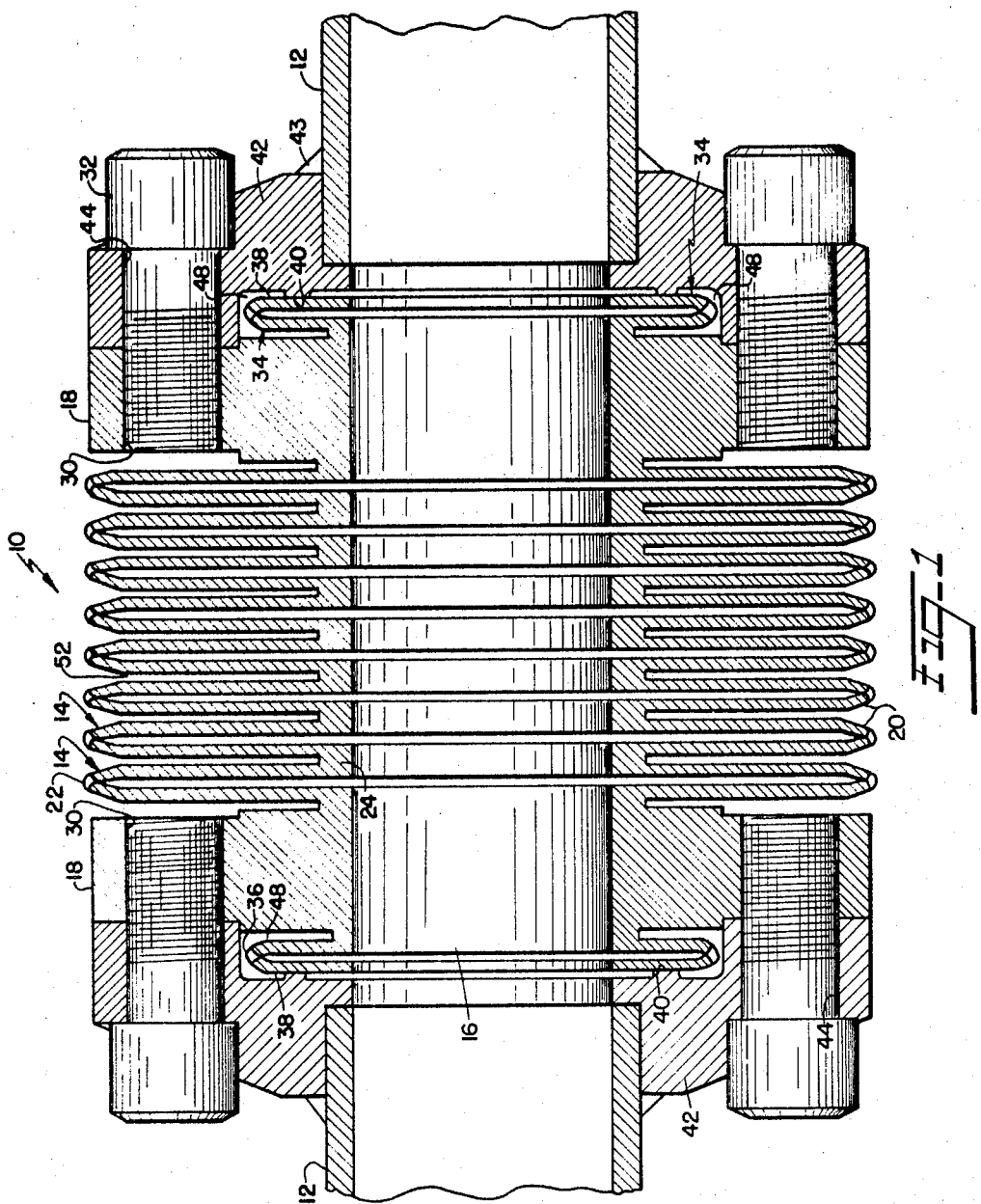
FIGURE 1 is a transverse sectional view of one form of coupling of this invention connected to fluid carrying pipes.

Referring now to the drawings wherein FIGURE 1 illustrates one embodiment of the novel coupling of this invention, the coupling comprises a body 10 formed from a single piece of stock and having a series of convolutions 14 surrounding an internal bore 16 and a pair of end flanges 18 adapted to provide a sealed conconnection with pipes 12. Convolutions 14 have side walls 20 which may be welded together along their outer peripheries as at 360° welds 22. The inner peripheries of convolutions 14 are integrally connected as indicated at 24. The convolutions form a bellows like arrangement which is both flexible and durable due to their integral connections.

End flange 18 are integrally connected to convolutions 14 and are provided with a series of peripherally spaced tapped holes 30 for receiving connecting bolts 32. Flanges 18 are spaced from the convolutions to provide clearance between the end convolutions and end flanges 18 for drilling and tapping holes 30 and for receiving connecting bolts 32 without penetrating the convolutions.

The outwardly facing surfaces of end flanges 18 are integrally connected to smaller convolutions 34 which are similarly welded at their outer peripheries 36. The outer walls 38 of convolutions 34 are ground and lapped to provide polished surfaces for sealingly engaging correspondingly polished surfaces rigidly associated with pipes 12 such as annular, axially-extending projections 40 on each of connecting members 42.

Connecting members 42 may be rigidly attached to pipes 12 by means such as welds 43 and are further provided with a series of axially extending drilled holes 44 near their outer peripheries. Connecting members 42 are brought into sealing engagement with end flanges 18 by means of connecting bolts 32 which pass through bores 44 in connecting members 42 into tapped holes 30 in flanges 18, thus providing a completely fluid-tight, all-metal seal having no internal welds. The engagement of end flanges 18 and connecting members 40 causes the formation of annular chambers 48. If any fluid leaks through the seal provided by the engagement of end walls 38 of convolutions 34 and annular projections 40 on connecting members 42, it will be trapped in chambers 48 between the connecting members and the end flanges. Further leakage is prevented by the seal formed between the inner surfaces of connecting members 42 and the outer surfaces of flanges 18. This arrangement provides an expansion and contraction compensating all-metal seal.

The flexible coupling of this invention is produced by a novel method which eliminates all internal cuts and welds and can be carried out in a single set-up in a lathe or other automatic forming machine.

The coupling may be formed from solid cylindrical stock such as an extruded billet or from a thick-walled tubular member having an internal diameter less than the desired final diameter. The cut-off of proper length may be made either before or after machining of the coupling. If a solid stock is used an initial bore of less diameter than the final desired diameter is bored or drilled before the machining steps are begun.

Figure 2:
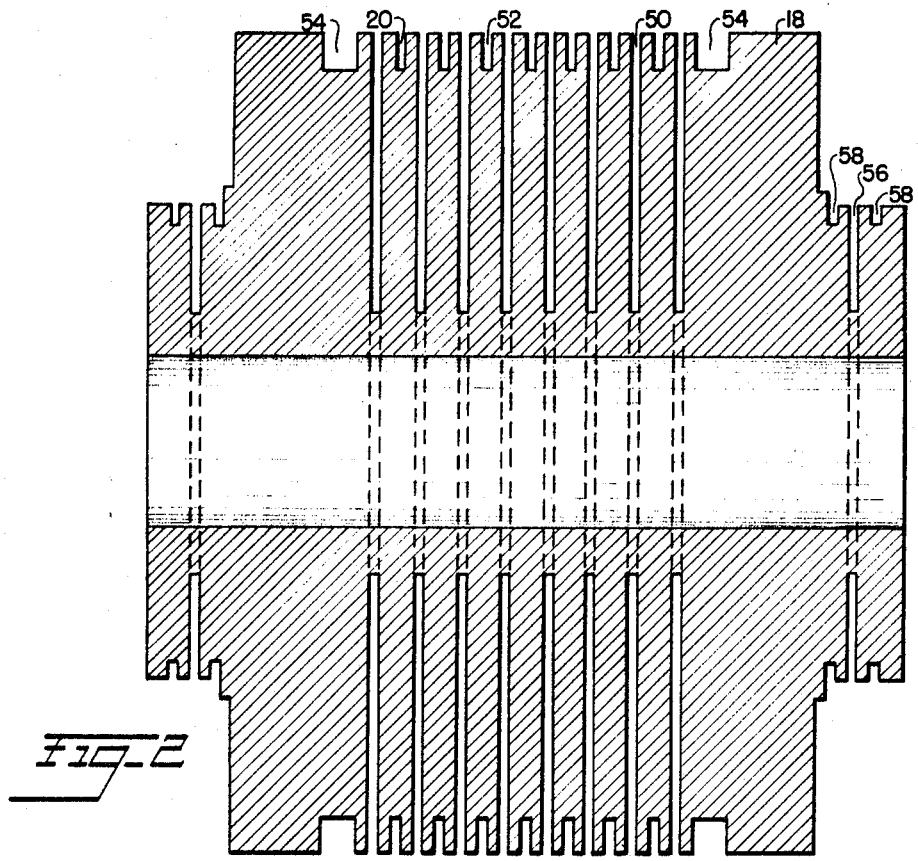
FIGURE 2 is a transverse sectional view of a partially completed machined coupling.
Figure 3:
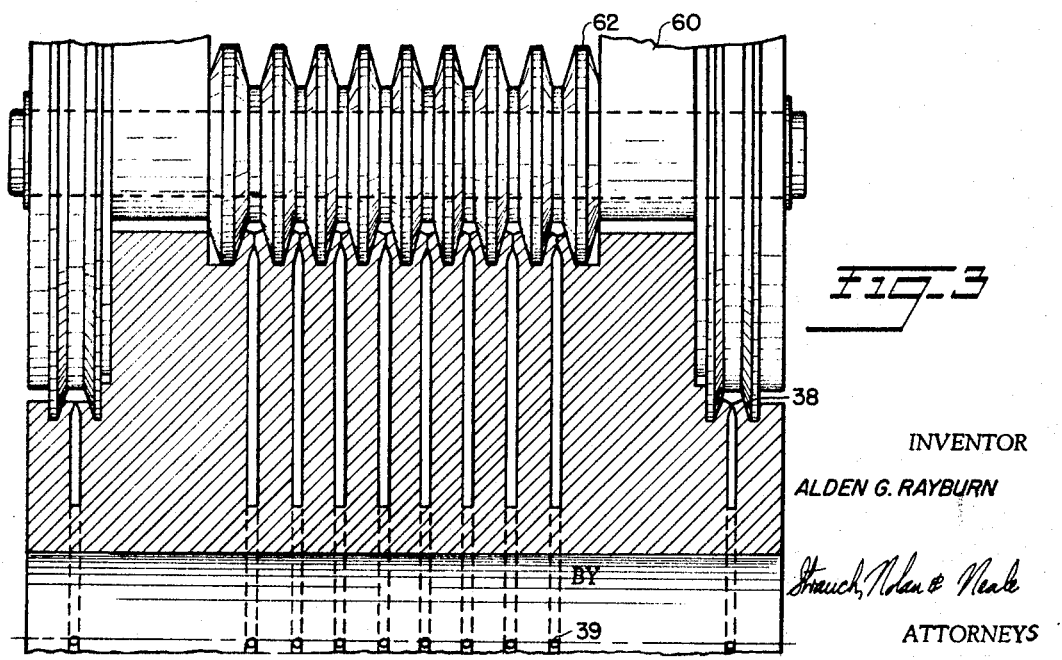
FIGURE 3 is a view of the upper portion of the coupling of FIGURE 2 shown in combination with a V-type work roller.
Figure 6:
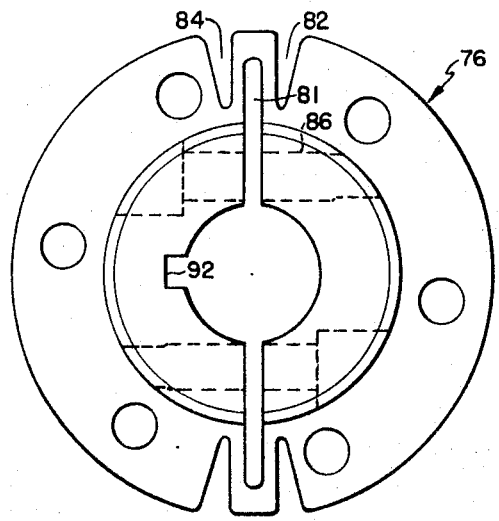
FIGURE 6 is an end view of the connecting member of the coupling of FIGURE 4.

Referring to FIGURES 2 and 3, which illustrate the coupling of FIGURE 1 in different stages of completion, after the bored stock is provided, the first step in this novel method comprises forming a series of annular deep grooves 50 and shallow grooves 52 in the outer periphery of the solid or thick-walled tubular stock. Shallow grooves 54, adjacent the first and last deep grooves are made wider than the other grooves for a reason to be discussed.

Annular deep grooves 50 should have an internal diameter less than the desired final internal diameter of the bellows, for example, for a bellows having a final internal diameter of 2″ the internal diameter of these grooves should be about 1 15/16″. After grooves 50, 52 and 54 have been formed, end flanges 18 are machined and may be provided with similar relatively deep grooves 56 and shallow grooves 58 which eventually form convolutions 34 of FIGURE 1.

The grooves in the bellows and end flanges may be formed by any conventional means, but two methods have been found to be most satisfactory. First, by the use of conventional grooving cutters which are able to cut the grooves quickly and accurately. Originally it was found that the use of this type of cutter in a groove as wide as ⅛″ caused the metal to crowd the groove resulting in a jamming of the cutter. Consequently, a novel method of cutting the grooves has been developed wherein two relatively narrow cutters are used such that one cutter is advanced along the groove ahead of the other. The trailing cutter overlaps a portion of the groove cut by the leading cutter so that the total groove is of the proper width, which is wider than either cutter, but each individual cut is narrow enough to prevent jamming and to cause the formation of relatively small chips that can be easily cleared during the operation.

The second means contemplated for cutting these grooves is a band saw. The thick-walled stock may be rotated past the band saw blade to provide the 360° alternate deep and shallow cuts required. In a preferred set-up, a series of band saws, broaches or grooving cutters is arranged so that all the grooves are cut simultaneously.

After all cuts have been made and the end flanges machined, outer side walls 20 of the deeper grooves may be bent into contiguous relationship by suitable equipment such as V rolls 60 as shown in FIGURE 3. The wedge-shaped discs 62 of rolls 60 are inserted in the shallow grooves 52 and pressure is applied downwardly causing side walls 20 of deeper grooves 50 to be bent toward each other and make contact. Normal spring-back of the walls causes a small amount of separation after rolls 60 have passed. Wide end grooves 54 allow the V rolls to fit easily into position. Grooves 54 may also be provided with oblique end walls as shown in FIGURE 4.

After side walls 20 have been brought substantially into contact around the entire periphery of the coupling, they are welded together to provide 360° welds 22 (FIGURE 1). Any conventional welding processes such as, for example, the Heli-Arc process can be used. Preferably the welding step is performed immediately after side walls 20 have been bent into contiguous relationship by V rolls 60, and the welds are made approximately the same thickness as side walls 20. The welding step can be easily accomplished without any problems of alignment because convolutions 14 are integrally connected when welds 22 are made.

Pressure build-up within deep grooves 50 due to gases produced in the welding step may be prevented by drilling at least one small-diametered pressure-relief aperture 39 in the bottom of each groove prior to welding.

After welds 22 have been made, the depths of shallow grooves 52, 54 and 58 as shown in FIGURE 1, may be increased to provide flexibility for the coupling; and end flanges 18 may be finished by machining off the extra metal and polishing end walls 38 of convolutions 34. End walls 38 are then ground and lapped to provide a highly polished metal sealing surface. Holes 30 may now be drilled and tapped in end flanges 18. Preferably six tapped holes are made for threaded bolts to insure proper alignment of end flanges 18 and connecting members 42.

The flexible coupling is completed by increasing the diameter of bore 16 to the desired final diameter in a reaming, boring or grinding step, causing convolutions 14 to freely communicate along their inner periphery with bore 16. This step may be facilitated by using supporting rollers (not shown) to engage the outer grooves thereby preventing the walls from being displaced by center boring.

Residual stresses set up as a result of the welding and forming steps may be relieved by proper heat treatment or shot-peening steps depending on the metal selected for the coupling.

Connecting members 42 can be cast in a shell-molding or investment casting process or can be die-forged.

By the use of this novel method, accurately dimensioned, thick-walled couplings of any desired dimensions can be produced in a very short time. For example, in one set-up a final 2″ bore machined bellows was produced with maintained tolerances of ±0.005″ from a thick-walled stock having an outside diameter of 6″ and an initial internal bore of 1.25″. The deep and shallow grooves were each 0.062″ wide and were initially 2.062″ and 0.500″ deep, respectively. The shallow grooves were cut to a final depth of 1.875″ and the convolution side walls were uniformly machined to a thickness of 0.093″.

Although this method has been discussed with respect to the embodiment illustrated in FIGURES 1 to 3, it is to be understood that by appropriate variations in the machining steps various specific thick-walled couplings with integrally connected end flanges and convolutions can be produced.

FIGURE 4 illustrates another embodiment of the novel coupling of this invention in combination with driving and driven shafts such as shafts 64. This coupling comprises the bellows body 66, formed by a series of integrally connected convolutions 68, and integrally connected end flanges 70. The internal bore 72 of this coupling does not have to be as large as that in the fluid carrying coupling of FIGURE 1. Similarly, the convolutions 68 need not be of as large a diameter because this coupling is not designed to transport fluid from one member to another.

End flanges 70 are similar in construction to end flanges 18 of FIGURE 1 and further may be provided with an outwardly facing annular recess 74 about internal bore 72 for a reason to be discussed.

Connecting members 76 are similar in construction to the connecting members discussed with respect to FIG- URE 1 and further may be provided with annular axially extending ridges 78 and annular slots 80 which provide ridges 78 with a degree of radial flexibility so that ridges 78 can be easily fitted into annular recesses 74 of end flanges 70. Members 76 also are provided with radial expansion slots 81, 82 and 84 and tapped holes 86 for receiving clamping bolts 90, as shown in FIGURE 5. The internal bores of connecting members 76 are shaped so as to non-rotatably receive shafts 64. For example, the bores could be squared, splined or provided with a keyway such as 92 in FIGURE 5 for receiving a key 94 that may be carried by shafts 64.

Radial slots 81, 82 and 84 should be perpendicular to tapped hole 86 to allow radial expansion of connecting members 76 when clamping bolts 90 are removed allowing shafts 64 to be easily inserted or removed from internal bores 72. These slots provide a novel clamping arrangement for tightening connecting members 76 on shafts 64 and members 76 thereby aid in preventing backlash during operation of the shafts.

Figure 7:
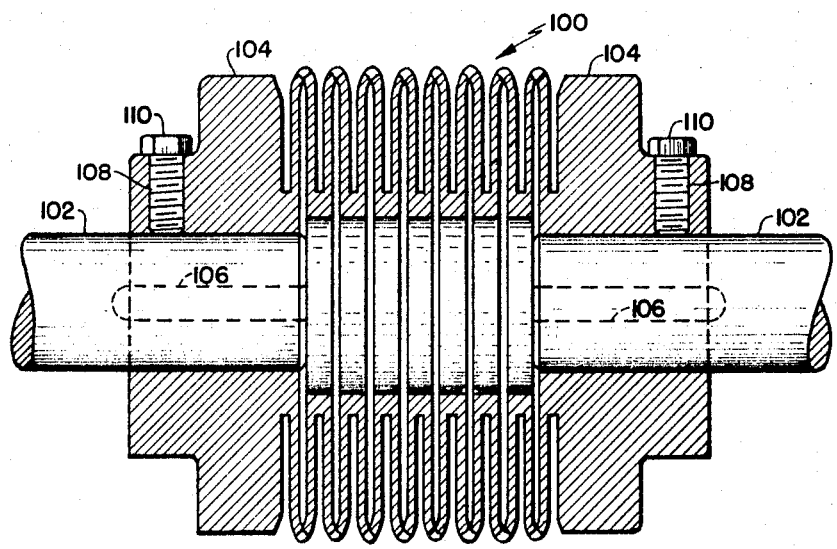
FIGURE 7 is a transverse sectional view of another embodiment of the coupling of this invention.

Coupling 100 as shown in FIGURE 7 is formed from one piece of sotck and connects drive and driven shafts 102 by means of integrally connected end flanges 104 without the use of separate connecting members. Flanges 104 may be provided with keyways for receiving keys 106 on the shafts. End flanges 104 are further provided with radially extending tapped holes 108 for receiving pinching bolts 110 which secure the flanges by abutting the respective shafts.

It is contemplated that by adding suitable seals, a coupling as shown in FIGURE 7 could be filled with fluid to provide a shock absorbing connection between the drive shafts. The unitary construction of this coupling substantially eliminates problems that arise from leakage between adjacent coupling members. This unitary construction could also be provided for fluid carrying couplings such as shown in FIGURE 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of producing a flexible hollow metal coupling comprising; the steps of providing a thick-walled internally bored stock; forming a series of alternate relatively deep and shallow annular grooves in the outer periphery of said stock; bending the outer edges of adjacent side walls of said deep grooves toward each other; welding said walls to each other at their outer periphery; and increasing the diameter of said internal bore to cause said deep grooves to circumferentially communicate with said internal bore.

2. The method of claim 1 wherein said deep grooves are provided with at least one aperture at the bottom thereof before their upper walls are bent toward each other.

3. The method of claim 1 wherein all the operations are accomplished in a single set up.

4. The method of claim 1 wherein the entire series of grooves are formed simultaneously.

5. The method of claim 1 wherein said side walls are bent toward each other by means of a V-roller and immediately welded.

6. A method of producing a metallic coupling as set forth in claim 1 including the step of shot peening said finished coupling to relieve stresses developed therein during the forming steps.

References Cited

UNITED STATES PATENTS

| 1,926,628 | 9/1933 | Morehouse. | |
| 2,175,596 | 10/1939 | Erling. | |
| 2,304,828 | 12/1942 | Joy. | |
| 1,752,106 | 3/1930 | Persons | 64—13 |
| 1,871,227 | 8/1932 | Smith et al. | 64—13 |
| 1,717,196 | 6/1929 | Emmet | 29—454 |
| 2,071,583 | 2/1937 | Schutt | 29—454 |
| 2,407,745 | 9/1946 | Jacobson | 285—226 |
| 2,434,224 | 1/1948 | Paul | 285—226 |
| 2,862,729 | 12/1958 | Bredtschneider | 285—226 |
| 2,870,617 | 1/1959 | Peters | 64—15 X |
| 3,019,037 | 1/1962 | Caldwell | 285—226 |
| 3,106,414 | 10/1963 | Peters | 285—226 |
| 3,150,506 | 9/1964 | Alcaro | 64—15 |
| 3,216,747 | 11/1965 | Green | 285—110 |

FOREIGN PATENTS

| 665,954 | 2/1952 | Great Britain. |
| 820,544 | 9/1959 | Great Britain. |
| 856,681 | 12/1960 | Great Britain. |
| 763,089 | 12/1956 | Great Britain. |
| 272,052 | 2/1951 | Switzerland. |

CHARLIE T. MOON, Primary Examiner

U.S. Cl. X.R.

29—481; 64—13; 92—45; 285—226